March 3, 1959
L. BUCALO
2,875,646
ANGULAR SPEED REDUCING MECHANISM
Filed Oct. 25, 1954
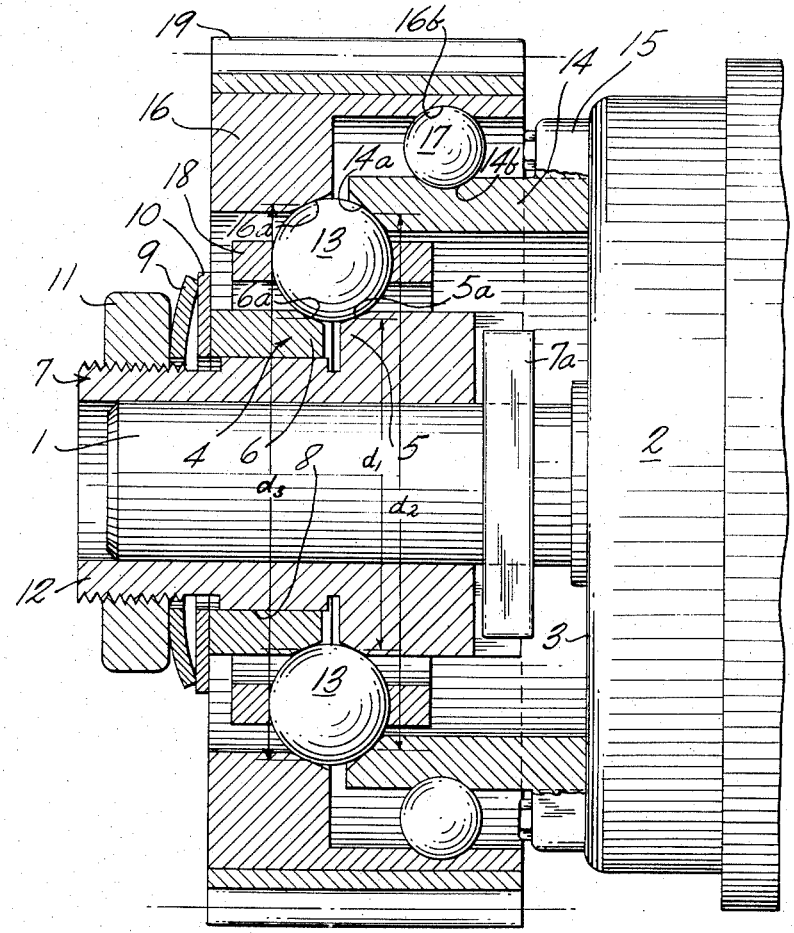
INVENTOR.
LOUIS BUCALO
BY
John C. McGregor
his ATTORNEY

United States Patent Office 2,875,646
Patented Mar. 3, 1959

2,875,646

ANGULAR SPEED REDUCING MECHANISM

Louis Bucalo, Holbrook, N. Y., assignor to Specialties, Inc., Syosset, N. Y., a corporation of New York Application October 25, 1954, Serial No. 464,576

6 Claims. (Cl. 74—798)

This invention relates to speed reducing mechanism. More particularly, it relates to speed reducing mechanism which can achieve ratios of angular speed reduction of an extremely high order but which is at the same time simplified in its design and economical in its construction.

There are numerous applications for speed reducing mechanisms in precision equipment, much of the demand for which has been met by such common expedients as gear trains. Conventional speed reducing devices, and particularly gear trains, tend to introduce errors in precision equipment because of backlash, are apt to be costly to manufacture, particularly when the ratios of speed reduction are high, and are often subject to destruction in the case of rough handling or overloading.

In accordance with the present invention, there is provided an effective, simplified speed reducing mechanism which can be entirely free of gearing, which has inherent protection against destruction when overloaded, and which can be made to achieve ratios of speed reduction of an extremely high order. A speed reducing mechanism formed in accordance with the present invention can include a series of at least three relatively rotatable ball bearing race parts which cooperatively define an annular ball track comprised of inner and outer races for a single ring or complement of bearing balls. One of the three race parts can be formed to define one complete race of the track and can be driven by a high speed input shaft. The other two race parts are made complementary to define the second race, opposing the first to complete the track. The complementary race parts, which are rotatable relatively to each other as well as to the first race part, are formed with surfaces which incline toward each other at different angles, thereby to engage the balls at different distances from the axis of rotation of the unit, that is, the axis about which the balls revolve as they roll in the annular track.

One of the complementary race parts can be more or less immobilized as by joining to the frame of the unit, and the other permitted to turn under the influence of the balls to afford the reduced output motion. In operation, the balls will be caused, upon rotation of the input shaft and the first race part, to revolve about the axis of the input shaft and at the same time to rotate about their respective axes. The third race part deriving component velocities from the balls will then be driven at a greatly reduced speed relative to that of the input shaft and the output motion can be picked off by any suitable means. Many different velocity components in the output can be achieved by establishing different degrees of inclination of the second and third race parts.

The invention, from which other applications and features thereof will be readily apparent to those skilled in the art, is fully described below, having reference to the accompanying drawing of a representative embodiment of the invention in which an angular speed reducing unit is shown, partly in longitudinal section and partly in elevation.

Referring to the drawing, there is shown a rotary speed reducing unit adapted to be driven by high speed input shaft 1 which can be coupled to a driving source such, for example, as an electric motor 2, including a stationary housing portion 3. Mounted on the input shaft 1 is an annular, inner race assembly 4 which can, although not necessarily, be composed of two axially spaced race parts 5 and 6.

The race part 5 can be formed integrally with a sleeve member 7 fixed to turn with the shaft 1 as by a drive pin 7a. The race part 6 can take the form of an annular member slidably mounted on a cylindrical surface 8 formed on the sleeve member 7 and is resiliently urged toward the companion race part 5 by spring means in the form, for example, of a bowed spring 9 compressed between a washer 10, which abuts the outer edge of the race part 6, and a nut 11 threaded onto an extension 12 of the sleeve member 7. The race parts 5 and 6 are formed with opposing inclined race surfaces 5a and 6a respectively, which surfaces define the inner race for a ring or complement of balls 13. The balls 13 tend to hold the race parts 5 and 6 spaced apart against the action of the spring washer 9 and in this fashion, the race assembly 4 is spring loaded to take up the wear both in the balls and in the race surfaces. It will be understood, however, that, if preferred, the inner race assembly 4 can take the form of a simple circular race surface formed, for example, on the sleeve member 7 or the shaft 1.

The ball track is completed by means of an outer race assembly including at least two complementary race parts 14 and 16 arranged to engage the outer halves of the balls 13, radially speaking with respect to the axis of the input shaft 1, i. e., the axis about which the balls revolve. The race parts 14 and 16 are rotatable relatively to one another as well as to the inner race assembly 4.

The ability of the race part 14 to turn is closely controlled and to this end it may be completely immobilized as by attachment to the frame 3 of the motor 2 through a mounting flange 15. The race part 14 is formed with an annular surface 14a for engaging each of the bearing balls 13, the surface 14a preferably being oblique or inclined with respect to the axis of the shaft 1 for reasons presently to be described.

The track or orbit for the balls 13 is completed by the race part 16 which is formed with a ball engaging surface 16a inclined with respect to the surface 14a of the race part 14. The race part 16 is free to be rotated under the control of the balls relative to the inner race assembly 4 and the race part 14 and, to this end, can be journalled, for example, on the race part 14 or on any other suitable supporting surface. In the illustrated arrangement, the race part 16 is partly supported for rotation by the race part 14 by a ring or complement of bearing balls 17 operating in recessed tracks 16b and 14b formed respectively in opposed and radially spaced surfaces of the race parts 16 and 14. It will be seen that the balls 17, being received in recessed tracks, serve to stabilize the race part 16 against axial movement, thereby insuring tight working engagement between the annular ball-engaging surface 16a and each of the bearing balls 13.

The relative spacing of the balls 13 in their orbit and the relative spacing of the balls 17 in their orbit can be maintained by conventional means such, for example, as ball cages or retainers, as represented by the cage 18. As will be apparent from the following description, no torque need be transmitted through the cage 18 and, as a consequence, close tolerances need not be maintained in its manufacture. As stated, the output of the speed reducing unit is derived from the rotating race part 16 and to facilitate the picking off of the output motion any suitable coupling can be used, such, for example, as the illustrated ring gear 19 carried on the outer surface of the race part 16. After assembly, the unit is adjusted for operation by tightening the nut 11 so as to apply a spring load between the race parts 5 and 6, wedging the balls 13 radially outwardly, thereby to preload the assembly radially.

It will be seen that the surfaces 5a and 6a have tangent points with respective balls around circles of substantially equal diameter $d_1$, that the surface 14a has a tangent circle of diameter $d_2$, and that the surface 16a has a tangent circle of diameter $d_3$, which differs slightly from $d_2$. The difference between diameters $d_2$ and $d_3$, which is a function of the relative angularity of the surfaces 14a and 16a, dictates the magnitude of the speed reduction. It will be readily understood that the diametrical variation can be effected by changing no more than the angle of one surface, say 16a, so that units affording a wide range of speed reductions, whether they be in the vicinity of 20 to 1 or 250 to 1, can be fabricated using the same stock of basic parts for all units.

In operation, the high speed rotary input motion of the shaft 1 carries with it the race assembly 4. This motion, coupled with the forces imparted to the balls by the fixed or controlled race part 14, causes the balls to roll in a circular orbit about the axis of the shaft 1, with the portion of each ball which engages the surface 14a being constrained to a zero component of motion and with the portions of the balls which engage the race assembly 4, or more particularly the surfaces 5a and 6a, assuming a motion which is a function of the radial spacing of those surfaces of the axis from the input shaft 1. Noting that the surfaces 14a and 16a of the race parts 14 and 16 respectively are inclined at different angles to the axis of the shaft 1, it will be seen that they are at slightly different radial distances from the axis at the point of tangency with the balls 13. The resultant driving motion is thereby established between the balls 13 and the freely rotatable race part 16. By varying the inclination of the surface 16a relative to the surface 14a, the magnitude of the motion imparted to the race part 16 can be changed. In the illustrated arrangement, by forming the surface 16a at a lesser angle to the axis of the shaft 1, the speed of rotation of the race part 16 can be increased and, conversely, by increasing the angle, it can be decreased. A point of infinite speed reduction or zero rotation of the race part 16 will result when the angle of the surface 16a to the axis of the shaft 1 is precisely equal to the angle of the surface 14a to the shaft 1.

A further increase in the angle of the surface 16a would, of course, result in rotation of the race part 16 in the opposite direction. Thus, the surface 16a, if angled as illustrated in the drawing, will cause the race part 16 to rotate in the opposite direction to the shaft 1, while if angled more steeply than the surface 14a will cause the race part 16 to rotate in the same direction as the shaft 1. It will be apparent, therefore, that a large range of speed reductions can be achieved and that, with the exception of the pitch or angle of the surfaces 14a and 16a, speed reducing units having different speed reductions can be precisely identical. Thus, the manufacture of a complete line of speed reducing units can be greatly simplified, it being necessary only to vary the setting of one grinding operation.

It will be further understood that a speed reducing unit formed in accordance with the present invention may embody various changes in detail without departing from the scope of the invention. Thus, the race part 16 can be supported by means other than the use of the outer surface of the race part 14 and a bearing support other than a ball bearing may be used for this purpose. Furthermore, the arrangement of the retainers or cages can be varied as can the configuration and detail of the race assembly 4, in which, for example, the surfaces 5a and 6a can be formed as sections of a sphere rather than as conical sections as shown. If preferred, the input or driving race assembly 4 can be interchanged in its position with the race parts 14 and 16, in which case the reduced output speed would be delivered at the inner rather than outer regions of the unit. Also, in certain cases, sections of balls can be used in place of fully spherical balls. The invention should not be regarded as limited, therefore, except as defined by the following claims.

I claim:

1. In speed reducing mechanism, a ball bearing assembly including annular, relatively rotatable inner and outer race means and a complement of balls joining the race means, one of the race means being comprised of at least two relatively rotatable annular race parts having ball-engaging surfaces to engage the complement of balls on tangent circles of different diameters, means to immobilize one of the race parts against longitudinal and rotational motion, output means on the other race part, an input shaft, the other of said race means being comprised of a pair of race parts mounted on said shaft and having ball-engaging surfaces to engage the complement of balls on a pair of tangent circles, means for urging one of said last named race parts towards the other to load the ball bearing assembly, said relatively rotatable, annular race parts having radially opposed ball bearing races formed thereon to define a ball track spaced from said complement of balls opposing faces of said ball bearing races having aligned grooves therein, and a second complement of balls in said track.

2. In speed reducing mechanism, sleeve means adapted to receive an input drive shaft to turn therewith, an inner ball bearing race on the outer surface of said sleeve means, an outer ball bearing race opposing the inner race, a complement of balls joining the races, said outer race comprising at least two race parts having ball-engaging surfaces to engage the balls on tangent circles of different diameters, means to immobilize one of the race parts, and output means on the periphery of the other of said race parts, said two race parts having opposed, spaced apart annular surfaces on said race parts opposing faces of said opposed, spaced apart annular surfaces having aligned grooves therein and a complement of balls between said surfaces to define a supplemental bearing for said race part having said output means thereon.

3. Apparatus according to claim 2, said inner ball bearing race comprising a first ball-engaging surface formed on the sleeve and inclined with respect to the axis thereof, an annular member mounted on the sleeve for axial movement thereon and having a ball-engaging surface inclined oppositely to that of the first surface to define therewith a recessed track, a nut threaded in the sleeve, and spring means between the nut and the annular member.

4. Apparatus according to claim 1, including motive means having a drive shaft received in the sleeve and a frame, said means to immobilize the one race part comprising means affixing the latter to the frame.

5. Apparatus according to claim 2, said other race parts having an external cylindrical surface, and said output means including gear teeth on said surface.

6. In a speed reducing mechanism, an input shaft having external threads at one end thereof, an inner ball bearing race, said inner race comprising a pair of complementary race parts having oppositely inclined ball-engaging surfaces to engage a complement of balls on two tangent circles and to define a recessed track for such balls, one of said pair being fixed to said shaft, a spring washer surrounding said shaft adjacent said threads and the other of said pair of race parts, nut means to urge the other of said pair axially toward the first of said pair of race parts, an outer ball bearing race radially opposing said inner race, a complement of balls joining said races, said outer race comprising a pair of race parts to engage the balls on two tangent circles, means to immobilize one of said outer race parts, and output means on the other of said outer race parts, said outer race parts including a pair of radially spaced apart surfaces defining a second ball bearing race, a second complement of balls in the second race, whereby said race part carrying said output means finds a bearing on said immobilized race part.

References Cited in the file of this patent

FOREIGN PATENTS

| | | | |
|---|---|---|---|
| 95,797 | Austria | Jan. 25, | 1924 |
| 164,383 | Austria | Nov. 10, | 1949 |
| 636,682 | France | Apr. 14, | 1928 |
| 992,167 | France | July 4, | 1951 |
| 238,226 | Great Britain | Feb. 11, | 1926 |
| 217,668 | Great Britain | June 2, | 1927 |